United States Patent [19]
Kurome et al.

[11] Patent Number: 5,800,118
[45] Date of Patent: Sep. 1, 1998

[54] APPARATUS AND METHOD FOR USE IN MANUFACTURE OF FED OBJECTS

[75] Inventors: Hideo Kurome, Matsue; Kouta Tamura, Shiga; Kenichi Watanabe, Izumo, all of Japan

[73] Assignee: Murata Manufacturing Co., Ltd., Nagaokakyo, Japan

[21] Appl. No.: 746,472

[22] Filed: Nov. 12, 1996

[30] Foreign Application Priority Data

Nov. 14, 1995 [JP] Japan .................. 7-295054

[51] Int. Cl.⁶ .................................. B65G 35/00
[52] U.S. Cl. .................. 414/676; 414/755; 198/397
[58] Field of Search .................. 414/676, 755; 198/493, 443, 397; 193/2 R

[56] References Cited

U.S. PATENT DOCUMENTS

| | | | |
|---|---|---|---|
| 3,300,065 | 1/1967 | Witmer | 193/2 R |
| 3,603,646 | 9/1971 | Leoff | 414/676 |
| 3,731,783 | 5/1973 | Dreher et al. | 198/493 |
| 4,242,038 | 12/1980 | Santini et al. | 414/755 |
| 4,298,307 | 11/1981 | Bergman | 414/676 |
| 4,425,075 | 1/1984 | Quinn | 414/755 |
| 4,768,640 | 9/1988 | Sticht | 198/493 |
| 5,297,666 | 3/1994 | Marti Sala | 198/397 |
| 5,431,527 | 7/1995 | Yamazaki et al. | 414/676 |

FOREIGN PATENT DOCUMENTS 439 101  12/1967  Russian Federation .

Primary Examiner—Thomas J. Brahan
Assistant Examiner—Douglass Hess
Attorney, Agent, or Firm—Burns, Doane, Swecker & Mathis, LLP

[57] ABSTRACT

An apparatus and a method for use in manufacture of fed objects which is able to handle (e.g., convey and/or array) the fed objects in a soft manner and prevent the fed objects from suffering mechanical damage. A chamber is provided below a perforated plate having a multiplicity of fine holes formed therein and having an upper surface inclined at an angle relative to a horizontal plane. Compressed air is introduced into the chamber through a supply pipe to be ejected from the upper surface of the perforated plate. The ejected air causes fed objects placed on the upper surface side of the perforated plate to float above the perforated plate and moves them due to the inclination of the upper surface. The fed objects thus moved are received one by one into pockets formed in a rotating stopper wall at a periphery of the perforated plate.

13 Claims, 3 Drawing Sheets

APPARATUS AND METHOD FOR USE IN MANUFACTURE OF FED OBJECTS

BACKGROUND OF THE INVENTION

1. Field of the Invention

The present invention is employed in a manufacturing process of objects, which are to be fed along a production line, for conveying and/or arraying the fed objects, and particularly relates to an apparatus and a method for use in the manufacture of fed objects which are advantageously employed in a step of supplying the fed objects. The term "fed objects" used in the specification (including the claims) means not only objects which are introduced into a manufacturing process, or a step thereof, but also finished products.

2. Description of the Related Art

An apparatus for use in manufacture of fed objects, which is of interest in relation to the present invention, is an object or part feeder for supplying fed objects. In a part feeder, fed objects each having the form of a disk or a rectangular parallelpiped in the stage prior to attachment of lead wires, for example, are supplied for production as follows. A plurality of fed objects in a random state are arrayed and conveyed along a supply track while being subject to vibration. At the end of the supply track, the fed objects are taken out one by one while they remain in an arrayed state, and then supplied to a subsequent step of, for example, attaching lead wires.

In the above manufacturing process, to convey and/or array the fed objects, mechanical damage such as cracks, chips or rubbing-off the fed objects must be prevented. Ceramic electronic parts such as capacitors having a single plate of plain ceramic as a dielectric, for example, are susceptible to such mechanical damage. This mechanical damage often brings about fatal defects.

During manufacture of fed objects using a part feeder, there occurs a problem that the fed objects rub against the wall surfaces of the supply track and so on. Also, since the supply rate of fed objects on the supply track is usually set greater than the take-out rate of fed objects from the end of the supply track, the fed objects are often so jammed on the supply track that excessive fed objects drop off the supply track. The impact from dropping may crack or chip the fed objects.

SUMMARY OF THE INVENTION

A purpose of the present invention is, therefore, to provide an apparatus and a method for use in the manufacture of fed objects which are able to prevent the fed objects from suffering such mechanical damage as stated above.

To achieve the above purpose, the present invention is constituted, in brief, such that a plurality of fed objects are placed on the upper surface side of a perforated plate having a multiplicity of fine holes formed therein, and compressed air is ejected to the upper surface side of the perforated plate through the fine holes, thereby bringing the plurality of fed objects into a floating state, i.e., floating above the perforated plate for a further manufacturing process.

More specifically, an apparatus for use in the manufacture of fed objects according to the present invention comprises a perforated plate having a multiplicity of fine holes formed therein and having upper and lower surfaces, a chamber defining a space of which an upper surface is provided by the lower surface of the perforated plate, and an air path for introducing compressed air into the chamber. In that arrangement, the compressed air introduced into the chamber is ejected from the upper surface of the perforated plate through the fine holes while a plurality of fed objects are placed on the upper surface side of the perforated plate, so that the plurality of fed objects float above the perforated plate for a further manufacturing process.

The above apparatus for use in manufacture of fed objects may further comprise means for giving the fed objects an initial speed for moving the fed objects in the state floating from the perforated plate in a predetermined direction. The means for giving an initial speed is provided, for example, by inclining the upper surface of the perforated plate relative to a horizontal plane.

Also, the above apparatus may further comprise a pocket positioned on the side at the end of movement of the fed objects in the predetermined direction for receiving the fed object separate from the other objects. The pocket is moved, for example, in a direction crossing the direction of movement of the fed objects in the state floating from the perforated plate.

A preferred embodiment of the apparatus for use in manufacture of fed objects according to the present invention comprises a perforated plate having a multiplicity of fine holes formed therein and having upper and lower surfaces, the upper surface being inclined relative to a horizontal plane, a chamber defining a space of which upper end surface is provided by the lower surface of the perforated plate, an air path for introducing compressed air into the chamber, and a stopper wall provided on the upper surface of the perforated plate to extend in the form of a ring and having a plurality of pockets formed along an inner periphery of the stopper wall to receive fed objects one by one, the stopper wall being rotatable about an axis vertical to the upper surface of the perforated plate. In that arrangement, the compressed air introduced into the chamber is ejected from the upper surface of the perforated plate through the fine holes while a plurality of fed objects are placed on the upper surface side of the perforated plate within an area surrounded by the stopper wall, so that the plurality of fed objects are brought into a state floating from the perforated plate and moved due to the inclination of the upper surface of the perforated plate to be received into the pockets formed in the stopper wall one by one.

In the above apparatus for use in manufacture of fed objects, preferably, the perforated plate is rotated together with the stopper wall.

A method for use in manufacture of fed objects according to the present invention comprises the step of placing a plurality of fed objects on the upper surface side of a perforated plate having a multiplicity of fine holes formed therein and having upper and lower surfaces, the step of supplying compressed air to the lower surface side of the perforated plate and ejecting the compressed air to the upper surface side of the perforated plate through the fine holes, thereby bringing the plurality of fed objects into a floating state above the perforated plate, and the step of moving the plurality of fed objects in the floating state in a predetermined direction.

In the above method for use in manufacture of fed objects, preferably, the upper surface of the perforated plate is inclined relative to a horizontal plane, and the step of moving the plurality of fed objects includes a step of moving the plurality of fed objects due to the inclination of the upper surface of the perforated plate.

With the present invention, since a plurality of fed objects are brought into a floating state above the perforated plate for a further manufacturing process, the fed objects are handled in a soft manner without rubbing against the surface receiving the fed objects, and mechanical damage is effectively prevented. Therefore, the present invention is advantageously used in handling ceramic electronic parts, e.g., capacitors having a single plate of plain ceramic as a dielectric, which are susceptible to mechanical damage.

Also, with the present invention, since a plurality of fed objects are brought into a floating state above the perforated plate, the fed objects are subjected to almost no friction resistance during movement over the perforated plate. Therefore, the fed objects can be easily moved in any desired direction. This ease in moving the fed objects enables the fed objects to be easily conveyed and/or arrayed.

When the apparatus for use in manufacture of fed objects according to the present invention includes means for giving the fed objects an initial speed for moving the fed objects in the floating state in a predetermined direction, as set forth above, the fed objects can be easily moved in the predetermined direction with almost no deceleration due to friction resistance. The means for giving an initial speed may be realized by means coming into direct contact with the fed objects and acting on the fed objects to move them, but preferably realized by inclining the upper surface of the perforated plate relative to a horizontal plane. By utilizing the inclination of the upper surface of the perforated plate to give the fed objects an initial speed, the means for giving an initial speed can be realized with a simpler construction and the probability of causing mechanical damages on the fed objects can be further reduced.

Further, with the apparatus wherein a pocket receiving the fed object separated from the others is provided on the side at the end of movement of the fed objects, as set forth above, a process including operation to separate the fed objects from one another, e.g., operation of taking out one of the fed objects randomly, can be efficiently performed by moving the fed objects to be each received in the pocket and taking out the fed object from the pocket successively. In this respect, by providing a plurality of pockets, it is also possible to easily take out a plurality of fed objects at a time. If the pocket is moved in a direction crossing the direction of movement of the fed objects, as set forth above, the fed object can be more smoothly received into the pocket.

With the apparatus for use in manufacture of fed objects according to the present invention wherein the upper surface of the perforated plate is inclined and a stopper wall is provided on the upper surface of the perforated plate to extend in the form of a ring, the stopper wall having a plurality of pockets formed along an inner periphery of the stopper wall to receive fed objects one by one and being rotatable about an axis vertical to the upper surface of the perforated plate, as set forth above as a preferred embodiment, the fed objects can be smoothly forwarded to enter the pockets which are brought to the lower side of the inclined upper surface of the perforated plate as the stopper wall rotates. Accordingly, by taking out the fed object from the pocket before the pocket having received the fed object reaches the top side of the inclined upper surface of the perforated plate, the fed object can be efficiently supplied to a subsequent step. In this respect, by taking out the fed objects from the multiple pockets at a time, a capability of supplying the fed objects can be further increased.

Additionally, by rotating the perforated plate together with the stopper wall, the fed objects can be damaged less due to being rubbed against the supporting surface and the probability of causing mechanical damages on the fed objects can be further reduced.

BRIEF DESCRIPTION OF THE DRAWINGS

The present invention will now be described by way of reference to the accompanying drawings in which.

DETAILED DESCRIPTION OF THE PREFERRED EMBODIMENTS

Figure 1:
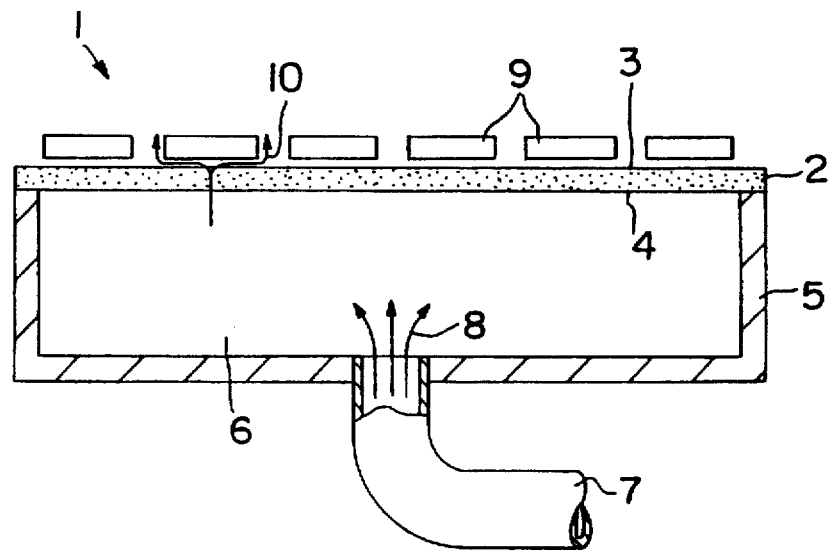
FIG. 1 is a sectional view of an apparatus for use in manufacture of fed objects according to a first embodiment of the present invention.

FIG. 1 is a sectional view of an apparatus 1 for use in manufacture of fed objects according to a first embodiment of the present invention.

As shown in FIG. 1, the apparatus 1 includes a perforated plate 2 having a multiplicity of fine holes formed to penetrate therethrough. The perforated plate 2 is made of, e.g., metal. The perforated plate 2 may be formed of a porous material which has fine holes inherently formed in the plate 2, such as a foamed metal, or a plate material which has a multiplicity of fine through-holes formed therein by post-machining, such as a metal plate. The perforated plate 2 is arranged with its upper surface 3 lying horizontally.

A lower surface 4 of the perforated plate 2 serves as an upper surface of a space 6 defined by a chamber 5. A supply pipe 7 is connected to the chamber 5. The supply pipe 7 provides an air path for introducing compressed air from a compressed air source (not shown) into the chamber 5 as indicated by arrows 8. The compressed air introduced into the chamber 5 is ejected out of the upper surface 3 side of the perforated plate 2 through the multiplicity of fine holes. On this occasion, the compressed air is spread over the chamber 5 to reside therein for a while so that a flow of the compressed air through the supply pipe 7 is essentially prevented from directly affecting the flow of the compressed air through the fine holes in the perforated plate 2. Therefore, the compressed air can be ejected from the upper surface 3 of the perforated plate 2 substantially uniformly over all of the upper surface 3.

A plurality of fed objects 9 are placed on the upper surface 3 of the perforated plate 2. The compressed air ejected to the upper surface 3 side of the perforated plate 2, as described above, acts on each of the fed objects 9 to bring it into a floating state, i.e., floating above the perforated plate 2. Also, at this time, the fed objects 9 floating above the perforated plate 2 are arranged two-dimensionally, i.e., on one plane, without overlapping one above another. Thus, by handling the fed objects 9 in such a floating state, mechanical damage of the fed objects 9 can be prevented, such as portions of the surface being rubbed off. Further, because the fed objects 9 are subjected to almost no friction resistance during movement, the fed objects 9 can be easily conveyed in any desired direction.

Figure 2:
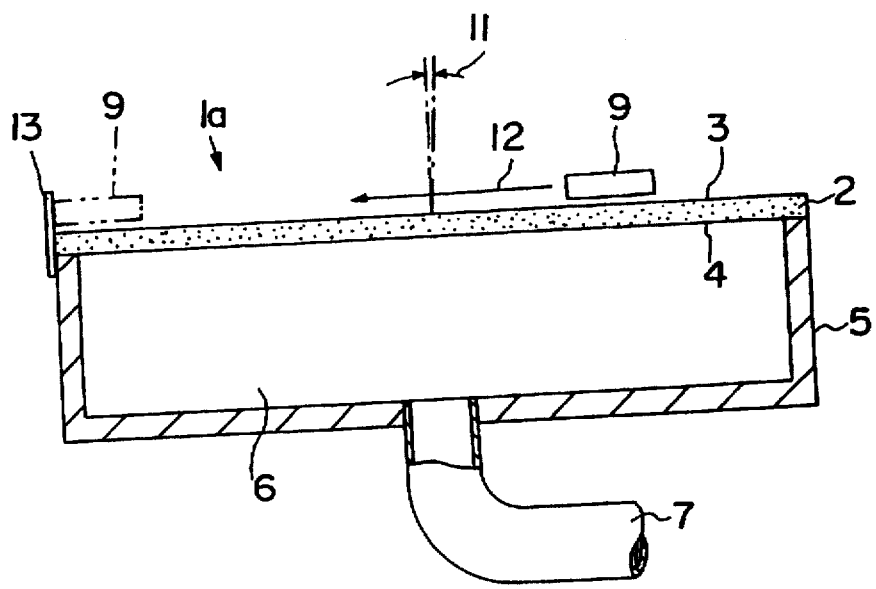
FIG. 2 is a sectional view of an apparatus for use in manufacture of fed objects according to a second embodiment of the present invention.

FIG. 2 is a sectional view of an apparatus 1a for use in manufacture of fed objects according to a second embodiment of the present invention. Since the apparatus 1a shown in FIG. 2 includes components common to those in the apparatus 1 shown in FIG. 1, the components in FIG. 2 common to those in FIG. 1 are denoted by the same reference numerals and will not be described below.

The apparatus 1a of this embodiment is of the same structure as the apparatus 1 shown in FIG. 1 except that it is inclined as a whole. Accordingly, the upper surface 3 of the perforated plate 2 is not horizontal, but inclined relative to a horizontal plane as indicated by an angle 11 of inclination. By so inclining the upper surface 3 of the perforated plate 2, the fed objects 9 floating above the perforated plate 2 can be each given with an initial speed for moving the fed object in a predetermined direction, as indicated by arrow 12. Each of the fed objects 9 given with an initial speed continues to move until it is received by a stopper wall 13 at the end of the perforated plate 2.

The apparatus 1a of this embodiment can be utilized to, for example, convey the fed objects 9 in a predetermined direction during manufacture of the fed objects 9.

Figure 3:
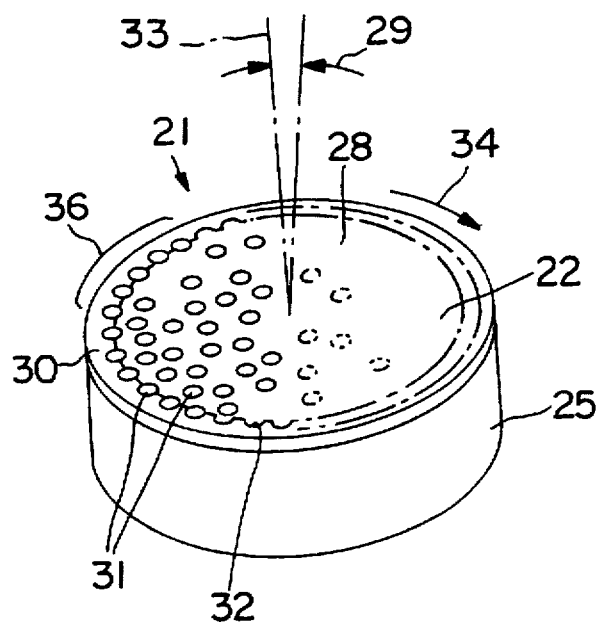
FIG. 3 is a schematic perspective view of an apparatus for use in manufacture of fed objects according to a third embodiment of the present invention.
Figure 4:
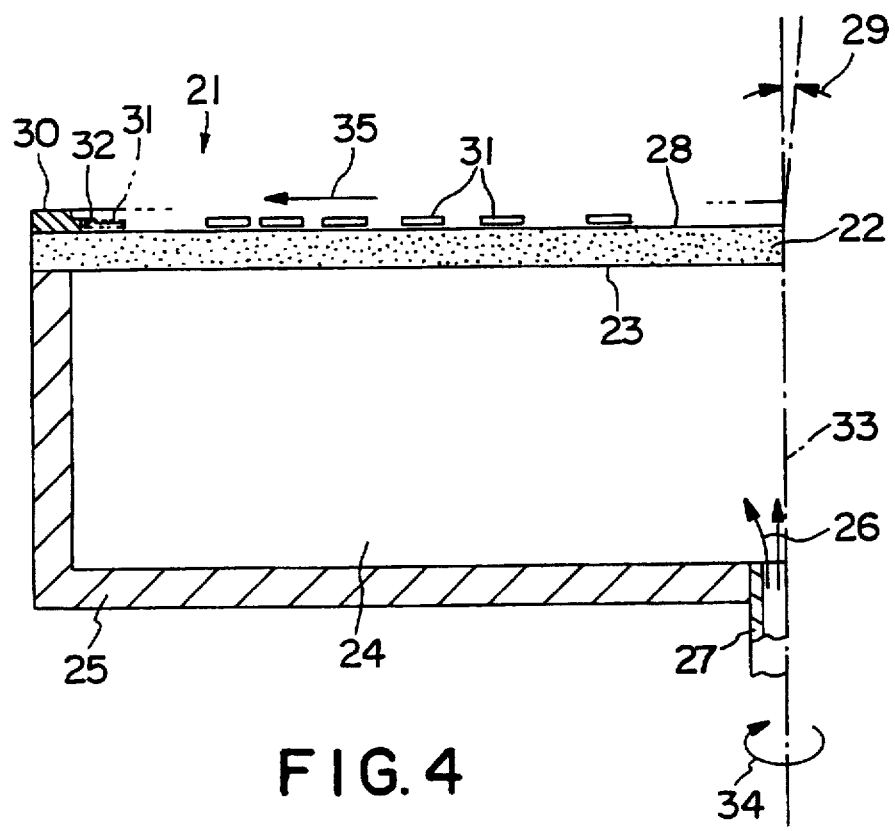
FIG. 4 is a sectional view showing, in enlarged scale, part of the apparatus for use in manufacture of fed objects shown in FIG. 3.
Figure 5:
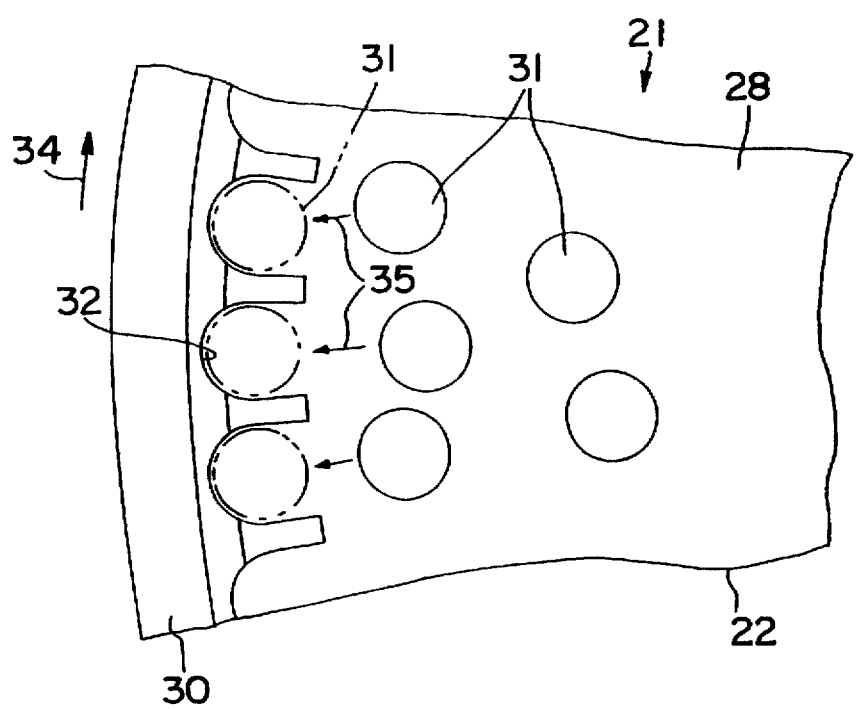
FIG. 5 is a plan view showing, in more enlarged scale, part of the apparatus for use in manufacture of fed objects shown in FIG. 3.

FIG. 3 is a schematic perspective view of an apparatus 21 for use in manufacture of fed objects according to a third embodiment of the present invention. FIG. 4 is a sectional view showing, in enlarged scale, part of the apparatus 21 shown in FIG. 3. FIG. 5 is a plan view showing, in more enlarged scale, part of the apparatus 21 shown in FIG. 3.

The apparatus 21 of this embodiment comprises, as with the foregoing apparatus 1 or 1a, a perforated plate 22 having a multiplicity of fine holes formed to penetrate therethrough, a chamber 25 defining therein a space 24 whose upper end surface is provided by a lower surface 23 of the perforated plate 22, and a supply pipe 27 which constitutes an air path for introducing compressed air into the chamber 25 as indicated by arrows 26 in FIG. 4. In this embodiment, the perforated plate 22 is disk-shaped and the chamber 25 is cylindrical.

Similarly to the foregoing apparatus 1a, the apparatus 21 of this embodiment is inclined as a whole. Accordingly, an upper surface 28 of the perforated plate 22 is not horizontal, but inclined relative to a horizontal plane as indicated by an angle 29 of inclination.

Furthermore, in the apparatus 21 of this embodiment, a stopper wall 30 is provided on the upper surface 28 of the perforated plate 22 to extend in the form of a ring. Along an inner periphery of the stopper wall 30, there are formed a plurality of pockets 32 each receiving one fed object 31. The plurality of pockets 32 are preferably positioned to be distributed with equal intervals therebetween. In this embodiment, the fed object 31 is, e.g., a capacitor made up of disk-shaped dielectric plain ceramic plates and having electrodes formed on both sides in the stage prior to attachment of lead wires to the electrodes. The pockets 32 each have a semicircular portion adapted for the disk-shaped fed object 31. It is to be noted that the fed object under manufacture may have the form of a rectangular parallelpiped and the pocket may have a rectangular or any other shape regardless of the shape of the fed object.

The apparatus 21 of this embodiment is rotatable in its entirety about an axis 33 vertical to the upper surface 28 of the perforated plate 22. Therefore, the stopper wall 30 is also rotated together with the perforated plate 2. As an alternative, the apparatus 21 may be modified such that only the stopper wall 30 is rotatable.

In the apparatus 21 thus constructed, a plurality of fed objects 31 under manufacture are placed on the upper surface 28 of the perforated plate 22 within an area surrounded by the stopper wall 30. At this time, compressed air is ejected from the upper surface 28 of the perforated plate 22 through the fine holes in the perforated plate 22, bringing the fed objects 31 into a floating state above the perforated plate 22.

Also, because the upper surface 28 of the perforated plate 22 is inclined as mentioned above, the fed objects 31 floating above the perforated plate 22 are moved due to the inclination of the upper surface 28, as indicated by arrow 35, and then received into the pockets 32 formed in the stopper wall 30 one by one. On this occasion, the stopper 30 is rotated in a direction indicated by arrow 34, and hence the pockets 32 are also rotated in the direction indicated by arrow 34, i.e., a direction crossing the direction of movement of the fed objects 31 indicated by the arrow 35. This allows the fed objects 31 to smoothly enter the pockets 32 one after another.

Before the pocket 32 having received the fed object 31 reaches the top side of the inclined upper surface 28 of the perforated plate 22, the fed object 31 is taken out of the pocket 32 and then supplied to a subsequent step of, for example, attaching lead wires. At this time, if a device for taking out the fed objects 31 is designed to be able to simultaneously take out the fed objects 31 in the multiple pockets 32 locating within a region 36, for example, shown in FIG. 3, a capability of supplying the fed objects 31 can be increased. It is preferable, though not limited to, that the stopper wall 30 be intermittently rotated and the fed objects 31 be taken out when the stopper wall 30 and hence the pockets 32 are stopped.

While the fed objects are described as, by way of example, ceramic electronic parts in the above embodiments, the present invention is also advantageously applied to manufacture of other fed objects, such as glass products, which are susceptible to mechanical damages during a manufacturing process. Furthermore, the present invention is not limited to the exemplary embodiments. Modifications will occur to skilled artisans without departing from the spirit and scope of the invention recited in the appended claims.

What is claimed is:

1. An apparatus for use in manufacture of fed objects, comprising:

a perforated plate having a multiplicity of fine holes formed therein and having upper and lower surfaces, a chamber defining a space of which an upper surface of the chamber is provided by the lower surface of said perforated plate, an air path for introducing compressed air into said chamber, the compressed air introduced into said chamber being ejected from the upper surface of said perforated plate through said fine holes while a plurality of fed objects are placed on the upper surface side of said perforated plate, so that said plurality of fed objects float above said perforated plate for a further manufacturing process, and a pocket receiving said fed objects separated from other objects, wherein said pocket is moved in a direction crossing a predetermined direction of movement of said fed objects in the floating state.

2. An apparatus for use in manufacture of fed objects according to claim 1, further comprising means for giving said fed objects an initial speed for moving said fed objects in the floating state in said predetermined direction.

3. An apparatus for use in manufacture of fed objects according to claim 2, wherein said means for giving an initial speed is provided by inclining the upper surface of said perforated plate relative to a horizontal plane.

4. An apparatus for use in manufacture of fed objects according to claim 2, wherein said pocket is positioned opposite to said means for giving said fed objects an initial speed for moving said fed objects in the predetermined direction.

5. An apparatus for use in manufacture of fed objects according to claim 3, wherein said pocket is positioned opposite to said means for giving said fed objects an initial speed for moving said fed objects in the predetermined direction.

6. An apparatus for use in manufacture of fed objects according to claim 1, wherein said perforated plate, said chamber, and said air path are configured to handle fed objects which are electronic parts.

7. An apparatus for use in manufacture of fed objects according to claim 1, wherein said perforated plate, said chamber, and said air path are configured to handle fed objects which are ceramic electronic parts.

8. An apparatus for use in manufacture of fed objects, comprising:

a perforated plate having a multiplicity of fine holes formed therein and having upper and lower surfaces, said upper surface being inclined relative to a horizontal plane, a chamber defining a space of which an upper surface of the chamber is provided by the lower surface of said perforated plate, an air path for introducing compressed air into said chamber, and a stopper wall provided on the upper surface of said perforated plate having a ring shape and having a plurality of pockets formed along an inner periphery of said stopper wall to receive fed objects one by one, said stopper wall being rotatable about an axis vertical to the upper surface of said perforated plate, the compressed air introduced into said chamber being ejected from the upper surface of said perforated plate through said fine holes while a plurality of fed objects are placed on the upper surface side of said perforated plate within an area surrounded by said stopper wall, so that said plurality of fed objects float above said perforated plate and moved due to the inclination of the upper surface of said perforated plate to be received into said pockets formed in said stopper wall one by one.

9. An apparatus for use in manufacture of fed objects according to claim 8, wherein said perforated plate is rotated together with said stopper wall.

10. A method for use in manufacture of fed objects, comprising the steps of:

placing a plurality of fed objects on an upper surface side of a perforated plate having a multiplicity of fine holes formed therein and having upper and lower surfaces, supplying compressed air to the lower surface side of said perforated plate and ejecting the compressed air from the upper surface of said perforated plate through said fine holes, thereby bringing said plurality of fed objects into a floating state above said perforated plate, moving said plurality of fed objects in the floating state above in a predetermined direction, receiving said fed objects in a pocket separated from other objects, and moving said pocket in a direction crossing said predetermined direction of movement of said fed objects in the floating state.

11. A method for use in manufacture of fed objects according to claim 10, wherein said fed objects are electronic parts.

12. A method for use in manufacture of fed objects according to claim 11, wherein said electronic parts are ceramic electronic parts.

13. A method for use in manufacture of fed objects according to claim 10, wherein the upper surface of said perforated plate is inclined relative to a horizontal plane, and said step of moving said plurality of fed objects includes a step of moving said plurality of fed objects due to the inclination of the upper surface of said perforated plate.

* * * * *